United States Patent Office 3,661,964
Patented May 9, 1972

3,661,964
METHOD FOR PREPARING AMINOALKYL-ALKOXY SILOXANES
Brian J. Griffiths, Herbert T. Cooper, and Peter F. Hudson, Glamorgan, Wales, assignors to Midland Silicones Limited, Reading, Berkshire, England
No Drawing. Filed July 17, 1970, Ser. No. 55,975
Int. Cl. C07f 7/08, 7/18
U.S. Cl. 260—448.8 R     3 Claims

ABSTRACT OF THE DISCLOSURE

Siloxane polymers containing both aminoalkyl and alkoxy substituents are defined by the general formula $$R_3SiO(CH_3R'SiO)_x(CH_3R''SiO)_y(R'''_2SiO)_zSiR_3$$

where R and R''' are hydrocarbyl radicals, R' is an alkoxy or alkoxyalkoxy of less than 6 carbon atoms, R'' is —XNY$_2$ where X is alkylene of 3–20 carbon atoms, the nitrogen being at least 3 carbons removed from Si, Y is hydrogen hydrocarbyl or trihydrocarbylsilyl, $x$ is 5 to 95, $y$ is 1 to 50, $z$ is up to 10% of $x+y$, $x+y+z$ is 20 to 100. These siloxanes are useful as release agents and water repellents on paper and other substrates.

---

This invention relates to novel organopolysiloxanes and to a process for the preparation of such siloxanes.

According to the invention there are provided organopolysiloxanes of the general formula

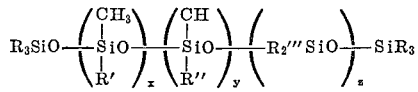

wherein each R and each R''' represents a monovalent hydrocarbon radical, R' is an alkoxy radical or alkoxyalkoxy radical of less than 6 carbon atoms, R'' represents a monovalent radical of the general formula —XNY$_2$ in which X represents an alkylene radical having from 3 to 20 carbon atoms, the nitrogen atom of the amino group being at least three carbon atoms removed from the silicon atom, and each Y represents a hydrogen atom, a monovalent hydrocarbon radical or a trihydrocarbonylsilyl radical any hydrocarbon substituents in Y being free from aliphatic unsaturation, $x$ has a value from 5 to 95 inclusive, $y$ has a value from 1 to 50 inclusive, $z$ has a value of up to 10 percent of the sum of $x$ and $y$ and $x+y+z$ has a value from 20 to 100.

In the general formula of the compounds of this invention each R and each R''', which may be the same or different, represent a monovalent hydrocarbon radical, for example the methyl, ethyl, propyl, decyl, cyclohexyl, vinyl, allyl, phenyl, naphthyl or benzyl radicals, R and R'' preferably each being methyl. As the R' radicals there are present alkoxy or alkoxyalkoxy radicals containing less than 6 carbon atoms, for example methoxy, ethoxy, butoxy, methoxyethoxy and methoxypropoxy radicals.

The aminoalkyl radicals R'' in the general formula are those represented by the general formula —XNY$_2$ wherein X and Y are as hereinabove defined. The Y substituents may be the same or different and may be for example, hydrogen, methyl, ethyl, propyl, octadecyl, phenyl, benzyl, trimethylsilyl and methyldiphenylsilyl. Examples of the operative R'' groups therefore are —(CH$_2$)$_3$NH$_2$, —(CH$_2$)$_3$N(CH$_3$), —(CH$_2$)$_4$N(CH$_3$)$_2$

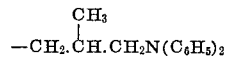

—C$_{11}$H$_{22}$N(CH$_3$)$_2$ and —C$_{11}$H$_{22}$N[Si(CH$_3$)$_3$]$_2$. Preferably R'' represents the gamma-aminopropyl or gamma-amino isobutyl radical.

The novel organosiloxanes of this polymer or copolymer by a novel process involving firstly the alkoxylation or alkoxyalkoxylation of the desired proportion of Si—H groups followed by reaction of some or all of the remaining Si—H groups with an unsaturated amine.

This invention therefore includes a process for the preparation of the organosiloxanes of the invention which comprises (1) reacting an organosiloxane of the general formula

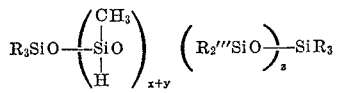

with sufficient of an alcohol R'H to react with $x$ of the silicon-bonded hydrogen atoms to produce ≡SiR' groups and (2) reacting the organosiloxane product obtained from (1) with an organic amine X'NY$_2$, wherein in the general formula X' represents an unsaturated aliphatic hydrocarbon radical having from 3 to 20 carbon atoms and one C=C linkage, the said linkage being at least as far away from the nitrogen atom as the position between the second and third carbon atoms and R, R', R''', $x$, $y$ and $z$ are as defined hereinabove.

The organosiloxanes employed in the process of this invention are known materials and methods of preparing them will be readily apparent to those skilled in the art. Among the operative organosiloxanes are trimethylsilyl-terminated methylhydrogen polysiloxanes and copolymers of methylhydrogen siloxane units, dihydrocarbonyl siloxane units and trihydrocarbonyl siloxane units, the proportion of dihydrocarbonyl siloxane units being up to 10 percent of the total of $x+y$. As the unsaturated organic amines there may be used for example, allylamine, N-allylaminotrimethylsilane, diethylmethallylamine and undecenylamine.

The first stage in the preparation of the organosiloxanes of this invention involves the partial alkoxylation of the silicon-bonded hydrogen atoms with an alcohol R'H e.g. methyl alcohol, ethyl alcohol or methyl cellosolve. The alkoxylation step is preferably carried out in the presence of a catalyst. A variety of materials will serve as catalysts in this reaction including zinc chloride, stannous-octoate, stannous acetate, dibutyltin dilaurate and chloroplatinic acid. The most preferred catalysts are the platinum compounds, e.g. chloroplatinic acid since these also function to catalyse the addition of the unsaturated amine in the second stage of the process. Sufficient of the alcohol should be employed to react with the desired proportion of SiH groups in the organosiloxane (1). Stoichiometric excess of the alcohol should, of course, be avoided if residual SiH groups are to be available for reaction with the unsaturated amine during the second stage of the preparative process. Both stages of the process are best carried out in the presence of an inert solvent since this facilitates dispersion of the catalyst and removal of unreacted alcohol following the first stage. The preferred solvents are the hydrocarbons for example benzene, toluene and xylene. Heat may be applied to expedite the reaction which is conveniently carried out at temperatures within the range from about 40 to 100° C.

Following the alkoxylation stage the unsaturated amine X'NY$_2$ is added. A platinum catalyst is also added if this is not employed during the first stage. When the unsaturated amine is a primary amine it is preferred to silylate the amine group prior to the addition reaction, by reaction of one or both amino nitrogen atoms with a silylating agent, for example, hexamethyldisilazane, to avoid deactivation of the catalyst by reaction of the primary amino groups with the SiH groups. As the silylated groups are susceptible to reaction with alcohols it is further preferred to remove, for example by azeotroping, any unreacted alcohol from the first stage prior to incorporation of the amine into the reaction mixture. When an unsaturated tertiary amine is employed it may be reacted directly with the organosiloxane in carrying out the second stage of the process.

The reaction involving the addition of the unsaturated amine to the SiH groups in the organosiloxane according to the second stage of the process of this invention is preferably performed at temperatures of 80° C. or higher. The ratio of reaction at temperatures below this is normally too low to be useful and the reaction is from about 100 to 140° C. Where the maximum degree of reaction of SiH groups is desired during the second stage of the reaction the amine reactant should desirably be employed in stoichiometric excess, for example a 10 to 50% excess over that required to react with the SiH groups remaining following the first stage reaction.

When the desired product is that containing the silylated amino nitrogen (Y being triorganosilyl) this may be obtained by the addition of the silylated amine as indicated above. In this case the product may be isolated by removal of solvent and by-products following the second stage reaction. When it is desired to regenerate the amino hydrogen atoms the product containing the silylated amino groups may be reacted with a large excess of an alcohol e.g. methanol.

The organosiloxanes of this invention are useful as water repellent and release coating materials for various substrates including textiles and paper. They are also useful as components of siloxane paper coating compositions where they function to improve the abrasion resistance of the cured siloxane film. For maximum storage life the siloxanes are best stored as solutions in organic solvents.

The following examples illustrate the invention:

EXAMPLE 1

To a solution of 60 g. of a trimethylsilyl-terminated methyl-hydrogenpolysiloxane having a molecular weight of 3000, in 89 grams of sulphur-free toluene, was added 0.4 ml. of a 10% w./v. solution of $M_2PtCl_6$ in isopropanol. The reaction mixture was heated to 40° C. and 28.8 gms. of Analar methanol was added dropwise at a rate such that a controllable exotherm (40–80° C.) was obtained. On completion of the methanol addition heat was applied and the reaction temperature was raised to remove unreacted methanol via a column and reflux divider as a methanol toluene azeotrope to a vapour temperature of 108–110° C.

A further 0.25 ml. of catalyst solution was then added and the reaction mixture heated at 100–105° C. under an $N_2$ purge for five minutes before adding 19.3 grams (50% w./w. excess of theory) of N-allylaminotrimethylsilane. The reaction mixture was then heated for two hours at 100–105° C. and allowed to cool to 40° C., when 19.2 gms. (300% w./w. excess of theory) of methanol was added. An exotherm of approximately 5° C. ensured. The reaction mixture was then heated for eight hours at 60–80° C. before distilling out solvent and by-products to 100° C. (pot temperature) at 2.0 to 0.5 mm. Hg. There was obtained 90 gms. of a dark brown oil soluble in most common solvents and having the following elemental analysis:

|     | Percent |
| --- | --- |
| Si | 30.18 |
| $N_{NA}$ | 1.59 |
| OMe | 26.5 |

EXAMPLE 2

To a solution of 60 g. of a trimethylsilyl-terminated methylhydrogen polysiloxane, having a molecular weight of 3000, in 89 grams of sulphur-free toluene, was added 0.4 ml. of a 10% w./v. solution of $H_2PtCl_6$ in isopropanol. The reaction mixture was heated to 40° C. and 28.8 gms. of Analar methanol was added dropwise at a rate such that a controllable exotherm (40–80° C.) was obtained. On completion of the methanol addition heat was applied and the reaction temperature was raised to remove unreacted methanol via a column and reflux divider as a methanol/toluene azeotrope to a vapour temperature of 108–110° C.

A further 0.25 ml. of catalyst solution was then added and the reaction mixture heated at 100–105° C. under an $N_2$ purge before adding 16.9 grams (50% w./w. excess of theory) N-allyldiethylamine. The reaction mixture was then heated for two hours at 100–105° C. before cooling to 40° C. when 20 gms. of methanol was added at 60–80° C. before distilling out solvent and by-products to 100° C. at 2.0 to 0.5 mm. Hg. There was obtained 85 grams of a light brown-coloured oil soluble in most organic solvents and having the following elemental analysis.

|     | Percent |
| --- | --- |
| Si | 29.1 |
| $N_k$ | 0.78 |
| OMe | 25.52 |
| SiH | 0.15 |

EXAMPLE 3

60 g. of a trimethylsilyl-terminated methylhydrogen polysiloxane having a molecular weight of 3000 was reacted with methanol according to the method described in Example 2.

When unreacted methanol had been removed as a methanol/toluene azeotrope a further 0.5 ml. of catalyst solution was added and the mixture heated to 100–105° C. under a nitrogen purge. Diethylmethallylamine,

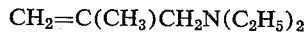

19 g. (50% w/w. excess of theory) was then added and the reaction mixture heated for a further 6 hours at 95–105° C. after which it was allowed to cool to about 40° C. and 20 g. of methanol added. The temperature was then raised and maintained at 70–80° C. for 16 hours. After removal of volatiles from the reaction mixture by stripping at 100° C. and 1.2 mm. Hg, 100 g. of a light brown oil was obtained. The oil was an organosiloxane having silicon-bonded methyl, methoxy and

radicals. Elemental analysis gave

|     | Percent |
| --- | --- |
| Si | 28.3 |
| $N_k$ | 0.80 |
| OMe | 24.9 |
| SiH | <0.1 |

That which is claimed is:
1. Organopolysiloxanes having the general formula

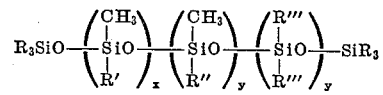

wherein each R and each R''' represents a monovalent hydrocarbon radical, R' is an alkoxy or alkoxyalkoxy radical of less than 6 carbon atoms, R'' represents a monovalent radical of the general formula —$XNY_2$ in which X represents an alkylene radical having from 3 to 20 carbon atoms, the nitrogen atom of the amino group being at least 3 carbon atoms removed from the silicon atom, and each Y represents a hydrogen atom, a monovalent hydrocarbon radical or a trihydrocarbonylsilyl radical, $x$ has a value from 5 to 95 inclusive, $y$ has a value from 1 to 50 inclusive, $z$ has a value up to 10 percent of the sum of $x+y$ and $x+y+z$ has a value of from 20 to 100.

2. Organopolysiloxanes as claimed in claim 1 wherein R'' represents the gamma-aminopropyl or gamma-aminoisobutyl radical.

3. Organopolysiloxanes as claimed in claim 1 wherein the R and R''' radicals are methyl radicals.

References Cited

UNITED STATES PATENTS

| | | | |
|---|---|---|---|
| 3,171,851 | 3/1965 | Pepe | 260—448.8 RX |
| 2,967,171 | 1/1961 | Barnes et al. | 260—46.5 E |
| 2,823,218 | 2/1958 | Speier et al. | 260—448.8 RX |
| 2,970,150 | 1/1961 | Bailey | 260—448.8 RX |
| 3,033,815 | 5/1962 | Pike et al. | 260—46.5 E |
| 3,087,909 | 4/1963 | Morehouse et al. | 260—46.5 E |
| 2,947,771 | 8/1960 | Bailey | 260—488.8 RX |

TOBIAS E. LEVOW, Primary Examiner

P. F. SHAVER, Assistant Examiner

U.S. Cl. X.R.

117—154; 260—46.5 E